United States Patent
Kelsch et al.

(10) Patent No.: US 11,319,731 B1
(45) Date of Patent: May 3, 2022

(54) MERCHANDISE ANTI-THEFT DEVICE HAVING A QUICK DISCONNECT LOCKING MECHANISM

(71) Applicants: Christopher A. Kelsch, Palm Harbor, FL (US); Vanguard Products Group, Inc., Oldsmar, FL (US)

(72) Inventors: Christopher A. Kelsch, Palm Harbor, FL (US); Jasen Paul Biggins, Tampa, FL (US); Lee Eckert, Sarasota, FL (US); John N. Figh, Jr., Oldsmar, FL (US); Matthew Kuntz, Tucson, AZ (US); Wade Zhu, Westchase, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 0 days.

(21) Appl. No.: 17/370,442

(22) Filed: Jul. 8, 2021

Related U.S. Application Data (60) Provisional application No. 63/050,482, filed on Jul. 10, 2020.

(51) Int. Cl.
  *E05B 73/00* (2006.01)
  *A47F 7/024* (2006.01)
  *F16M 11/04* (2006.01)

(52) U.S. Cl.
  CPC ........ *E05B 73/0064* (2013.01); *A47F 7/0246* (2013.01); *E05B 73/0082* (2013.01); *F16M 11/041* (2013.01); *F16M 2200/028* (2013.01)

(58) Field of Classification Search
  CPC ............. E05B 73/0017; E05B 73/0047; E05B 73/0082; E05B 73/0064; A47F 7/0246; A47F 7/024

USPC ........ 248/551, 553, 220.21, 220.22, 221.11, 248/222.13, 223.41, 225.11
  See application file for complete search history.

(56) References Cited

U.S. PATENT DOCUMENTS

| | | | | |
|---|---|---|---|---|
| 3,633,151 A | * | 1/1972 | Sensabaugh | H01R 13/22 439/333 |
| 4,066,231 A | * | 1/1978 | Bahner | B43M 99/00 248/289.11 |
| 4,458,872 A | * | 7/1984 | Couch | A47G 1/162 24/DIG. 32 |

(Continued)

OTHER PUBLICATIONS

Installation Guide: Tablet Quick Disconnect Bracket (K-TABQD-BKT), Vanguard Protex Global, Inc., Rev. Sep. 21, 2012.

*Primary Examiner* — Christopher Garft
*Assistant Examiner* — Michael McDuffie
(74) *Attorney, Agent, or Firm* — Andriy Lytvyn; Smith & Hopen, P.A.

(57) ABSTRACT

An anti-theft device for securing an article of merchandise against unauthorized removal from a display counter. A bracket securely holds the article of merchandise. A latch plate is attached to an underside of the bracket. The latch plate has a rail having a lip. A quick-release interface is anchored to a display counter. The quick-release interface has a flanged channel configured to receive the rail of the latch plate. A latch is disposed within the quick-release interface. The latch immobilizes the rail within the channel, thus securing the latch plate to the quick-release interface. The quick-release interface has an access port providing access to the latch using a specialized tool. The tool can be used to disengage the latch from the rail, thereby releasing the latch plate from the quick-release interface.

19 Claims, 6 Drawing Sheets

(56) References Cited

U.S. PATENT DOCUMENTS

| | | | | |
|---|---|---|---|---|
| 5,332,183 A | * | 7/1994 | Kagayama | B62J 6/00 248/222.13 |
| 5,555,302 A | * | 9/1996 | Wang | B60R 11/0241 379/426 |
| 5,903,645 A | * | 5/1999 | Tsay | B60R 11/0241 379/455 |
| 6,082,688 A | * | 7/2000 | Wilson | A01K 97/10 248/222.11 |
| 6,811,348 B1 | * | 11/2004 | Meyer | F16M 11/041 403/325 |
| 8,413,943 B1 | * | 4/2013 | Li | F16M 11/10 248/454 |
| 8,490,937 B2 | * | 7/2013 | Crain | F16M 11/041 248/316.6 |
| 8,596,595 B2 | * | 12/2013 | DeVito | F16M 11/041 248/220.31 |
| 8,711,553 B2 | * | 4/2014 | Trinh | F16M 11/041 361/679.02 |
| 8,814,128 B2 | * | 8/2014 | Trinh | F16M 11/041 248/551 |
| 9,097,380 B2 | * | 8/2015 | Wheeler | F16M 13/00 |
| 9,353,552 B1 | * | 5/2016 | Kelsch | A47F 5/00 |
| 10,111,537 B2 | | 10/2018 | Johnston et al. | |
| 10,322,764 B2 | * | 6/2019 | Thomas | B62J 9/21 |
| 10,378,248 B1 | | 8/2019 | Kelsch et al. | |
| 10,918,224 B2 | * | 2/2021 | Johnston | A47F 7/024 |
| 11,015,626 B2 | * | 5/2021 | Leyden | E05B 73/0082 |
| 2011/0068920 A1 | * | 3/2011 | Yeager | F16M 11/2021 340/568.8 |
| 2012/0126075 A1 | * | 5/2012 | Chinn | A61G 1/052 248/221.11 |
| 2012/0192600 A1 | * | 8/2012 | Johnston | A47F 7/024 70/58 |
| 2014/0346296 A1 | * | 11/2014 | Tschann | F16M 13/022 248/221.11 |
| 2015/0305518 A1 | * | 10/2015 | Galant | F16M 11/06 248/551 |
| 2016/0201359 A1 | * | 7/2016 | Berglund | G08B 13/1472 70/58 |
| 2021/0270410 A1 | * | 9/2021 | Horvath | F16M 11/041 |

\* cited by examiner

MERCHANDISE ANTI-THEFT DEVICE HAVING A QUICK DISCONNECT LOCKING MECHANISM

PRIORITY CLAIM

This non-provisional application claims priority to U.S. provisional application No. 63/050,482 filed on Jul. 10, 2020.

BACKGROUND OF THE INVENTION

1. Field of the Invention

This invention relates to merchandise anti-theft devices. More specifically, it relates to an anti-theft device having an interlocking assembly for securing an article of merchandise.

2. Brief Description of the Related Art

Retailers often prefer to present their merchandise to consumers in a way that allows the consumers to touch, inspect, and otherwise interact with the products at a display counter. Many merchandise items, especially portable electronic devices, are relatively expensive and, therefore, are under a serious threat of theft. Retailers often face a dilemma of balancing a need to interactively display their merchandise to attract customers and increase sales, with a need to safeguard the merchandise against theft.

One type of anti-theft device for securing articles of merchandise involves a bracket having retention arms that secure an article of merchandise by grasping the opposite edges thereof. An example of such device is disclosed in U.S. Pat. No. 10,378,248, entitled "Anti-Theft Device with Adjustable Locking Arms for Securing an Article of Merchandise." In this type of a security device, the bracket is positioned behind the article of merchandise, thus enabling customers to have full, unobstructed access to the front face—i.e., the screen—of the article of merchandise. However, to safeguard the article of merchandise against unauthorized removal from the retail store, the bracket must be securely connected to a display counter.

In certain circumstances, the retail stores have a need to quickly disconnect the bracket portion of the anti-theft device from the display counter, so that the bracket—and the article of merchandise secured therein—can be easily released and handed to the customer for a closer hands-on interaction or can be securely stored away in a safe when the retail store is closed, such as at night. It is also desirable that the bracket can be quickly and efficiently reconnected by locking it to an interface of the security device anchored to the retail display counter.

Thus, what is needed is an anti-theft device that enables store personnel to quickly and efficiently disconnect and, subsequently, reconnect a bracket of the anti-theft device retaining the article of merchandise to the interface of the anti-theft device anchored to the retail display counter.

SUMMARY OF THE INVENTION

The need for a retail security device having a quick connect and disconnect functionality is now met by a novel and non-obvious invention. In an embodiment, the invention pertains to an anti-theft device that uses a securing bracket having adjustable lockable arms to retain the merchandise therein. A latch plate attaches to the underside of the securing bracket. The latch plate has one or more rails disposed on the bottom surface thereof. The anti-theft device further includes a quick-release interface configured to couple to the latch plate, wherein the quick-release interface is anchored to a display counter. In an embodiment, the quick-release interface can be secured to the display counter using a mechanical tether—for example, a steel cable.

The quick-release interface has one or more longitudinal channels. Each longitudinal channel is configured to receive a corresponding rail of the latch plate. A torsion latch is rotationally disposed within the quick-release interface. The latch has a first position in which the latch is configured to engage the rail of the latch plate, and a second position in which the latch disengages the rail. When the latch is in its first position, the latch immobilizes the rail against movement within the longitudinal channel. In this manner, the latch plate remains securely coupled to the quick-release interface. In the second position, the latch disengages the rail of the latch plate, thereby enabling the rail to slide within the longitudinal channel of the quick-release interface. Thus, when the latch is in the second position, the rail can exit the longitudinal channel, thereby releasing the latch plate from the quick-release interface.

A tool is required to operate the latch to transition it into its second position. The quick-release interface has an access port providing access to the latch, so that the appropriate tool can be inserted via the access port. The tool can then be used to transition the latch into the second position, thereby disengaging the latch from the rail and releasing the latch plate from the quick-release interface.

In an embodiment, the longitudinal channel has a first elongated opening on a first surface of the quick-release interface. The first elongated opening enables the rail of the latch plate to translate within the longitudinal channel. The longitudinal channel has a second opening on a lateral surface of the quick-release interface, wherein the rail of the latch plate is configured to enter and exit the longitudinal channel via the second opening, and wherein the rail is restricted from exiting the longitudinal channel via the first opening. The latch plate may have a cover configured to occlude the second openings when the latch plate is coupled to the quick-release interface.

In an embodiment, the rail has a lip, and the longitudinal channel has a flange. The lip of the rail is configured to slide underneath the flange of the longitudinal channel when the latch plate is coupled to the quick-release interface. In this manner, the flange restricts the rail against exiting the longitudinal channel via the first opening.

In an embodiment, the rail has a notch configured to receive the latch. When the latch resides within the notch, the latch immobilizes the rail within the longitudinal channel. To couple the latch plate to the quick-release interface, the rail of the latch plate is inserted into the longitudinal channel and is translated therealong. The rail engages the latch and transitions the latch into the second position. When the latch becomes aligned with the notch, the latch returns to the first position and enters the notch, thereby immobilizing the rail within the longitudinal channel.

In an embodiment, the security device includes a pedestal mounted to the display counter. The quick-release interface is configured to removably rest on the pedestal. The pedestal and the quick-release interface may be equipped with complementary electrical contacts, such that electrical power can be transferred from the pedestal to the quick-release interface when the quick-release interface is at rest on the pedestal.

In an embodiment, a tether is connected to the quick-release interface. The tether passes through apertures within the pedestal and the display counter, and an anchor is attached to the tether underneath the display counter.

In an embodiment, the latch plate has a port providing access to the locking mechanism of the securing bracket. As a security measure, the port is concealed and inaccessible when the latch plate is coupled to the quick-release interface.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1:
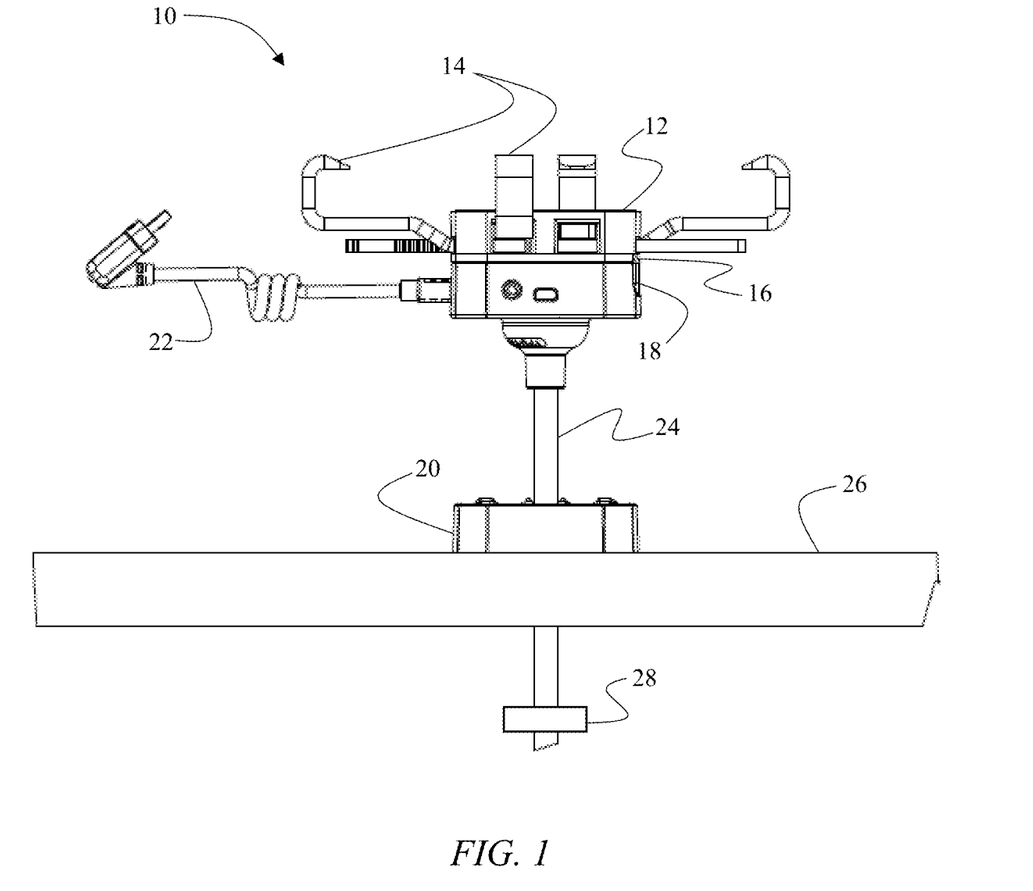
FIG. 1 is a side view depicting the anti-theft device.

FIG. 1 depicts a side view of security device 10. Security device 10 comprises a securing bracket 12 having a plurality of adjustable retaining arms 14 configured to receive and secure an article of merchandise. To secure merchandise—such as a smartphone—the merchandise is placed into bracket 12, and retention arms 14 are partially retracted into the housing of bracket 12 so that the C-shaped grips disposed on the terminal ends of arms 14 grasp edges/corners of the merchandise. After the merchandise is secured within bracket 12, a locking mechanism is engaged to immobilize retaining arms 14. An embodiment of securing bracket 12 is disclosed in more detail in U.S. Pat. No. 10,378,268.

Figure 3A:
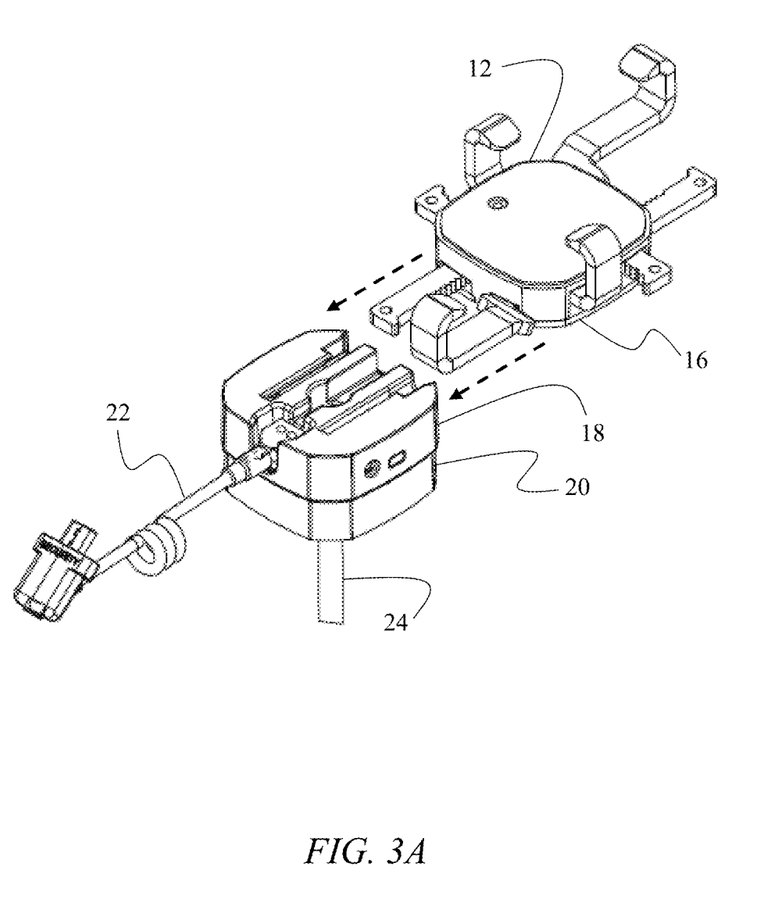
FIG. 3A is a perspective top view depicting the interaction between the quick-release interface and the latch plate.
Figure 3B:
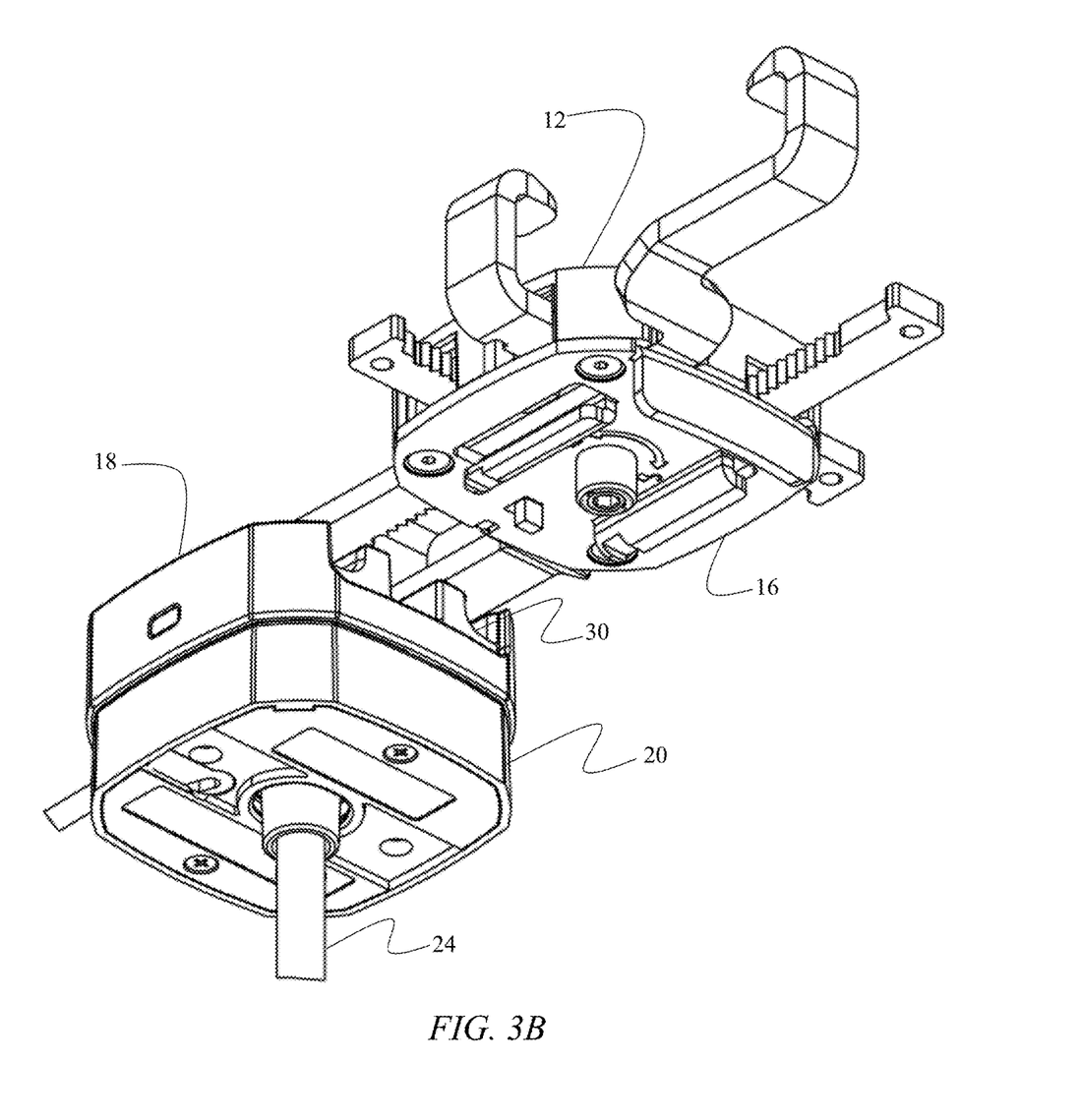
FIG. 3B is a perspective bottom view depicting the interaction between the quick-release interface and the latch plate.

FIG. 1 further depicts a latch plate 16 attached to the underside of securing bracket 12. FIG. 1 further depicts a quick-release interface 18 coupled to latch plate 16. In this manner, latch plate 16 is sandwiched between securing bracket 12 and quick-release interface 18. Latch plate 16 and quick-release interface 18 are depicted in more detail in FIGS. 4 and 5, respectively. The manner in which latch plate 16 is configured to couple to quick-release interface 18 is depicted in FIGS. 3A-3B.

Continuing reference to FIG. 1, a pedestal 20 is mounted onto a display counter 26. The top surface of pedestal 20 is configured to mate with the underside surface of quick-release interface 18. In this manner, quick-release interface 18 is configured to removably rest on pedestal 20.

In an embodiment, pedestal 20 has a plurality of electrical contacts, which are electrically connected to a power supply. The underside of quick-release interface 18 also has electrical contacts. When quick release interface 18 is at rest on pedestal 20, the electrical contacts of quick-release interface 18 engage the electrical contracts of pedestal 20, thereby enabling electrical power to be delivered from pedestal 20 to quick-release interface 18. Quick-release interface 18 may further comprise a power cable 22. A terminal end of power cable 22 has a connector configured to couple to a power cable of the merchandise. In this manner, when quick-release interface 18 is at rest on pedestal 20, electrical power can be delivered from pedestal 20 to the merchandise secured within bracket 12. In this manner, a battery of the merchandise can be recharged when quick-release interface 18 is at rest on pedestal 20.

FIG. 1 depicts that security device 10 may further include a tether 24, which secures quick-release interface 18 against unauthorized removal from a display counter 26. Tether 24 has a first end connected to quick-release interface 18 and a second end residing underneath a display counter 26. In this embodiment, pedestal 20 and display counter 26 have aligned apertures through which tether 24 passes. An anchor 28 is affixed to the second end of tether 24, underneath display counter 26. Anchor 28 is larger than the aperture within display counter 26, and therefore, anchor 28 prevents tether 24 from being fully withdrawn through the aperture. In this manner, tether 24 connects and secures quick-release interface 18 to display counter 20. Alternatively, instead of using a fixed-length tether 24 with anchor 28, tether 24 can be a retractable cable wrapped on a spinning reel.

Because securing bracket 12 is coupled to quick-release interface 18 via latch plate 16, the length of tether 24 dictates the maximum distance by which merchandise can be lifted from pedestal 20. Accordingly, a customer can lift the merchandise off pedestal 20 for a closer interaction but cannot steal the merchandise because the merchandise is secured to display counter 26 by tether 24. In an embodiment, tether 24 can be made of a strong metal or a metal alloy, for example, steel. In an alternative embodiment, quick release interface 18 can be mounted directly to pedestal 20 or display counter 26, foregoing tether 24. In such embodiment, merchandise is displayed stationarily and cannot be lifted for a closer interaction.

Figure 2:
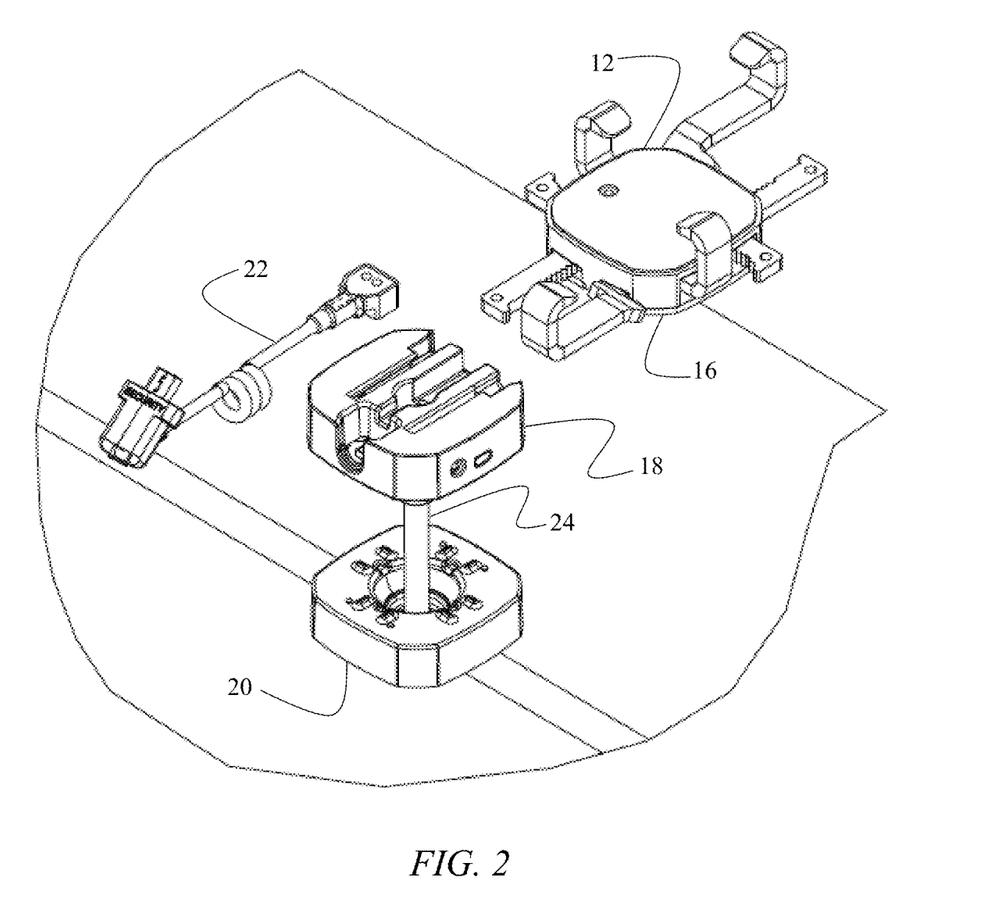
FIG. 2 is a perspective view of the anti-theft device in a decoupled configuration.

FIG. 2 depicts security device 10, with latch plate 16 decoupled from quick-release interface 18. FIG. 2 depicts that, when latch plate 16 is decoupled from quick-release interface 18, power cable 22 can be disconnected from quick-release interface 18. This feature enables store personnel to interchange power cables 22 having various connectors to accommodate the power port of merchandise being secured. Quick-release interface 18 has a recess configured to receive power cable 22. When latch plate 16 is coupled to quick-release interface 18, latch plate 16 covers the recess, thereby preventing power cable 22 from being disconnected from the quick-release interface 18 without first decoupling latch plate 16 from quick-release interface 18.

FIGS. 3A and 3B depict that securing bracket 12 is configured to couple to quick-release interface 18 by sliding rails 38 of latch plate 16 into channels 30 disposed within quick-release interface 18. As will described in more detail below, with reference to FIGS. 4-6, latch plate 16 and quick-release interface 18 have structural features that enable them to quickly and securely mate with one another. A locking mechanism is disposed within quick-release interface 18. In the coupled configuration, the locking mechanism is configured to immobilize latch plate 16 relative to quick-release interface 18. Because quick-release interface 18 is anchored to display counter 26 with tether 24, latch plate 16 and bracket 12 are secured against unauthorized removal from display counter 26. As was explained above, tether 24 allows bracket 12 (and the merchandise secured therein) to be lifted from pedestal 20 by a distance dictated by the length of tether 24. To release bracket 12 from the restraint of tether 24, latch plate 16 must be disconnected from quick-release interface 18.

Figure 4:
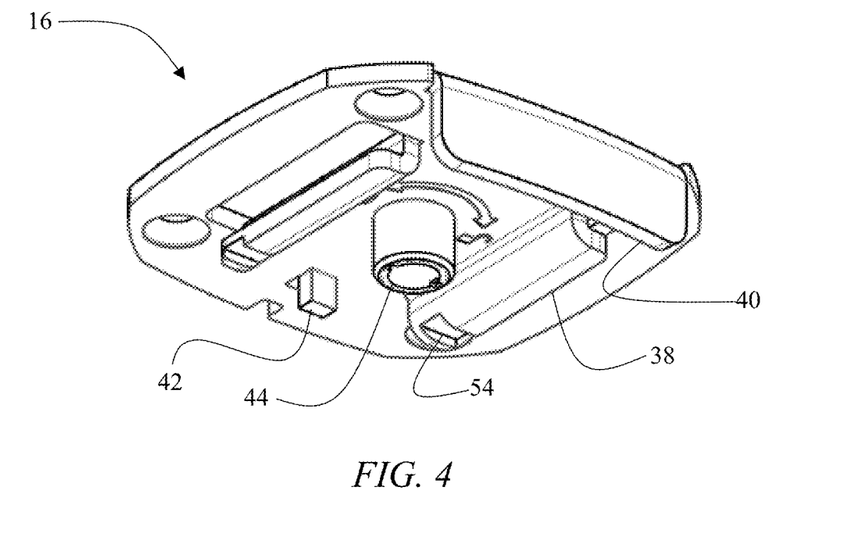
FIG. 4 is a perspective bottom view depicting the latch plate.
Figure 5:
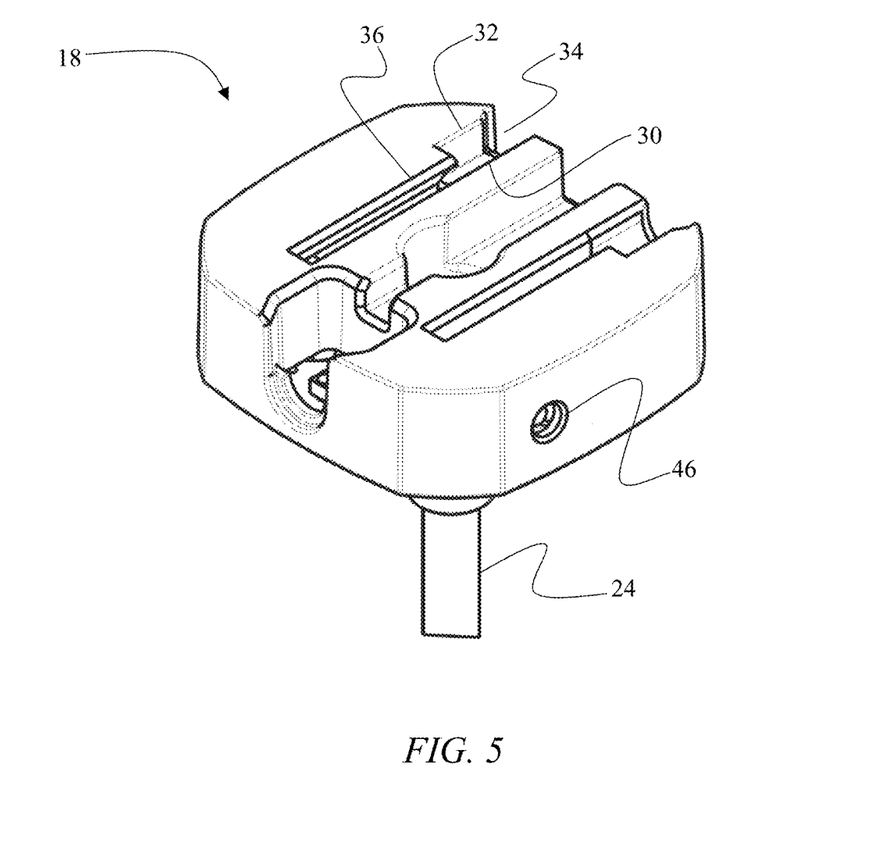
FIG. 5 is a perspective view of the quick-release interface.
Figure 6:
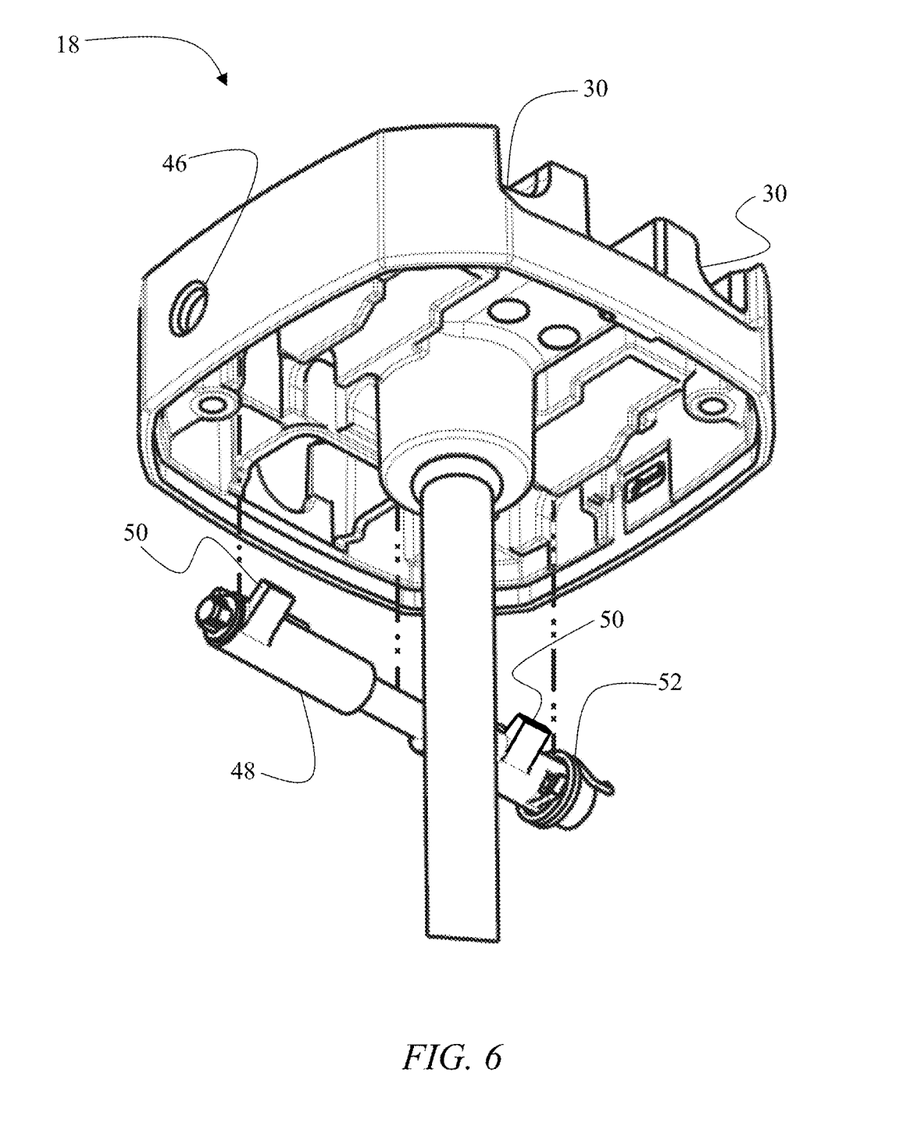
FIG. 6 is an exploded view of the quick-release interface depicting the torsion latch.

FIGS. 4-6 depict the structural features of quick-release interface 18 and latch plate 16 that enable them to interlock with one another. Specifically, FIG. 5 depicts that quick-release interface 18 has two longitudinal channels 30. Each channel 30 has a top opening 32 on the top surface of quick-release interface 18 and a lateral opening 34 on the lateral side of quick-release interface 18. Each channel 30 also has a flange 36 partially occluding top opening 32 of the channel at the top surface of quick-release interface 18.

FIG. 4 depicts latch plate 16 having two elongated rails 38. Rails 38 are configured to enter channels 30 through lateral openings 34. FIG. 4 further depicts that each rail 38 has a lip. When rails 38 are positioned within channels 30, flanges 36 engage the lips of rails 38, thereby preventing rails 38 from exiting channels 30 via top openings 32. In this manner, flanges 36 immobilize latch plate 16 against being lifted off quick-release interface 18. Thus, the only way to detach latch plate 16 from quick-release interface 18 is by sliding latch plate 16 relative to quick-release interface 18 so that rails 38 can exit channels 30 via lateral openings 34.

FIG. 4 further depicts that, latch plate 16 may have a front cover 40 configured to occlude lateral openings 34 of channels 30 when latch plate 16 is coupled to quick-release interface 18. In this manner, front cover 40 ensures that channels 30 cannot be accessed when latch plate 16 is coupled to quick interface 18. FIG. 4 also depicts that latch plate 16 may include a protrusion 42 configured to immobilize power cable 22 against removal from the recess of quick-release interface 18.

Finally, FIG. 4 depicts that latch cover 16 has a port 44 providing access to the locking mechanism of securing bracket 12. When latch plate 16 is coupled to quick-release interface 18, port 44 is concealed, and, therefore, securing bracket 12 cannot be unlocked. To access the locking mechanism of securing bracket 12, latch plate 16 must be decoupled from quick-release interface 18.

FIG. 5 depicts that quick-release interface 16 has an access port 46. As depicted in FIG. 6, access port 46 provides access to a torsion latch 48 rotationally disposed within quick-release interface 18. Torsion latch 48 has one or more teeth 50. Torsion latch 48 has a first position in which teeth 50 protrude into channels 30 of quick-release interface 18. Torsion latch 48 can be rotated about its central axis into a second position, in which teeth 50 are retracted away from channels 30.

Torsion latch 48 is structured such that the angular range of its rotation is restricted so that torsion latch 48 can only rotate between the first and second positions. Quick-release interface 18 further comprises a torsion spring 52 configured to bias torsion latch 48 toward the first position in which teeth 50 protrude into the channels 30.

FIG. 5 depicts that rails 38 of latch plate 16 have notches 54. Notches 54 are configured to receive teeth 50 of torsion latch 48 when torsion latch 48 is in its first position. When teeth 50 enter notches 54, they immobilize rails 38 against longitudinal movement within channels 30. Accordingly, when torsion latch 48 is in its first position and latch plate 16 is coupled to quick-release interface 18, torsion latch 48 immobilizes latch plate 16 relative to quick-release interface 18.

Latch plate 16 is configured to be locked to quick-release interface 18 in the manner depicted in FIGS. 3A-3B. First, latch plate 16 is positioned at the lateral side of quick-release interface 18 so that rails 38 align with lateral openings 34 of channels 30. Next, the user slides latch plate 16 laterally relative to quick-release interface 18, such that the rails 38 of latch plate 16 slide into channels 30 of quick-release interface 18. As rails 38 continue to slide within channels 30, proximal ends of rails 38 engage teeth 50 of torsion latch 48 causing torsion latch 48 to rotate in the counterclockwise direction, against the biasing force of torsion spring 52. In this manner, torsion latch 48 rotates into its second position in which teeth 50 are retracted away from channels 30, thereby permitting rails 38 to slide past torsion latch 48.

When rails 38 are fully inserted into channels 30, notches 54 become aligned with teeth 50. At this point, the biasing force of torsion spring 52 causes torsion latch 48 to rotate in the clockwise direction, back into its first position. In this first position, teeth 50 of the torsion latch 48 enter notches 52 of rails 38, immobilizing rails 38 against longitudinal movement within channels 30. In this manner, latch plate 16 is securely coupled to quick-release interface 18.

To release latch plate 16 from quick-release interface 18, torsion latch 48 must be rotated into its second position, in which teeth 50 exit notches 54. This can be accomplished by rotating torsion latch 48 in the counterclockwise direction, against the biasing force of torsion spring 52. To accomplish this, a specific tool (not shown) may be inserted into access port 46 of quick-release interface 18. The tool can be configured to engage torsion latch 48 and rotate it into the second position. When torsion latch 48 is rotated into its second position, teeth 50 exit notches 54, thereby releasing latch plate 16. Thus, to release latch plate 16 from quick-release interface 18, the tool must be used to rotate torsion latch 48 into its second position. While using the tool to maintain torsion latch 48 in its second position, the user applies a force onto latch plate 16 to slide latch plate 16 relative to quick-release interface 18 in the direction of channels 30. At this point, rails 38 can exit channels 30 via their lateral openings 34, thus releasing latch plate 16 from quick-release interface 18.

It shall be noted that the direction of rotation in the embodiment described above is merely exemplary. It will be appreciated that latch plate 16 and quick-release interface 18 can be structured so that torsion latch 48 rotates in counterclockwise direction when tooth 50 is displaced by rails 38 and, then, springs back in the clockwise direction when notches 54 are positioned over teeth 50. Such structural differences are merely a design choice and fall within the scope of the subject matter of the invention.

As should be evident from the description provided above, when latch plate 16 is coupled to quick-release interface 18, security device 10 provides multiple layers of security. First, port 44 through the which the locking mechanism of securing bracket 12 can be accessed is concealed. Thus, the merchandise cannot be released from retaining arms 14 while securing bracket 12 is coupled to quick-release interface 18 via latch plate 16. Second, tether 24 anchors quick-release interface 18 to display counter 26 and, therefore, prevents removal of merchandise from display counter 26. Third, only a specific tool (key) can be used to disengage torsion latch 48 from rails 38. Thus, without being in possession of this specific tool, a thief would not be able to decouple latch plate 16 from quick-release interface 18. Fourth, power cable 22 cannot be removed from quick-release interface 18 while quick-release interface 18 and latch plate 16 are coupled together.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device for securing an article of merchandise, comprising:
   a pedestal affixed to a display counter;
   a latch plate having a top surface and a bottom surface, the top surface of the latch plate being configured for attachment to a securing bracket, wherein the securing bracket is configured to retain the article of merchandise;
   a rail disposed on the bottom surface of the latch plate;
   a quick-release interface configured to couple to the latch plate, wherein the quick-release interface is configured to removably rest on the pedestal affixed to the display counter;
   a longitudinal channel disposed within the quick-release interface, the longitudinal channel configured to receive the rail of the latch plate; and
   a latch disposed within the quick-release interface, the latch having a first position and a second position, wherein in the first position, the latch is configured to engage the rail of the latch plate thereby immobilizing the rail against movement within the longitudinal channel, thus coupling the latch plate to the quick-release interface, and wherein in the second position, the latch disengages the rail of the latch plate thereby enabling the rail to translate within the longitudinal channel such that the rail can exit the longitudinal channel thereby releasing the latch plate from the quick-release interface, wherein to release the latch plate from the quick-release interface, the latch must be transitioned into the second position.

2. The anti-theft device of claim 1, wherein the longitudinal channel has a first elongated opening on a first surface of the quick-release interface, and wherein the longitudinal channel has a second opening on a lateral surface of the quick release interface, wherein the rail of the latch plate is configured to enter and exit the longitudinal channel via the second opening and wherein the rail is restricted from exiting the longitudinal channel via the first opening.

3. The anti-theft device of claim 2, wherein the latch plate is configured to occlude the first and the second openings when the latch plate is coupled to the quick-release interface.

4. The anti-theft device of claim 2, wherein the rail has a lip and the longitudinal channel has a flange, wherein the lip of the rail is configured to reside under the flange of the longitudinal channel when the latch plate is coupled to the quick-release interface, the flange restricting the rail against exiting the longitudinal channel via the first opening.

5. The anti-theft device of claim 4, wherein the quick-release interface has an access port providing access to the latch, such that the latch is accessible via the access port by a tool, wherein operation of the tool transitions the latch into the second position to disengage the latch from the rail, thereby releasing the latch plate.

6. The anti-theft device of claim 1, wherein the rail has a notch configured to receive the latch therein, whereby when the latch resides within the notch, the rail is immobilized within the longitudinal channel.

7. The anti-theft device of claim 6, wherein to couple the latch plate to the quick-release interface, the rail of the latch plate is inserted into the longitudinal channel and is translated therealong, whereby the rail engages the latch and transitions the latch into the second position, wherein when the latch becomes aligned with the notch, the latch returns to the first position and enters the notch, thereby immobilizing the rail within the longitudinal channel.

8. The anti-theft device of claim 1, wherein the pedestal and the quick-release interface are equipped with electrical contacts such that electrical power can be transferred from the pedestal to the quick-release interface when the quick-release interface is at rest on the pedestal.

9. The anti-theft device of claim 1, further comprising a tether connected to the quick-release interface, wherein the tether passes through an aperture within the pedestal.

10. The anti-theft device of claim 1, wherein the quick-release interface has a second longitudinal channel configured to receive and retain a second rail of the latch plate.

11. The anti-theft device of claim 1, wherein the latch plate has a port providing access to a locking mechanism of the securing bracket, wherein the port is concealed when the latch plate is coupled to the quick-release interface.

12. An anti-theft device for securing an article of merchandise, comprising:
    a pedestal affixed to a display counter;
    a quick-release interface configured to removably rest on the pedestal, the quick-release interface having a top surface and a bottom surface, the bottom surface being configured to mate with the pedestal;
    a securing bracket having a latch plate affixed thereto, wherein the latch plate is configured to couple to the top surface of the quick-release interface, and wherein the securing bracket is configured to receive and retain the article of merchandise; and
    a latch disposed within the quick-release interface, the latch having a first position and a second position, wherein in the first position, the latch is configured to engage the latch plate to couple the securing bracket to the quick-release interface, and wherein in the second position, the latch disengages the latch plate thereby releasing the securing bracket from the quick-release interface, wherein to release the latch plate from the quick-release interface, the latch must be transitioned into the second position.

13. The anti-theft device of 12, further comprising a tether connected to the quick-release interface, wherein the tether passes through an aperture within the pedestal, wherein the tether limits a distance by which the quick-release interface can be separated from the pedestal.

14. The anti-theft device of claim 12, wherein the latch plate has a rail and the quick-release interface has a longitudinal channel configured to receive the rail, wherein in the first position, the latch is configured to engage the rail thereby preventing removal of the rail from the longitudinal channel.

15. The anti-theft device of claim 14, wherein the longitudinal channel has a first elongated opening on the top surface of the quick-release interface enabling the rail to translate within the longitudinal channel and a second opening on a lateral surface of the quick-release interface, wherein the rail of the latch plate is configured to enter and exit the channel via the second opening and is restricted against exiting the channel via the first opening.

16. The anti-theft device of claim 15, wherein the longitudinal channel comprises a flange and the rail comprises a lip, wherein the lip of the rail is configured to reside underneath the flange of the longitudinal channel such that the flange restricts the rail against exiting the channel via the first opening.

17. The anti-theft device of claim 15, wherein the latch plate is configured to occlude the first and second openings when the securing bracket is coupled to the quick-release interface.

18. The anti-theft device of claim 12, wherein the securing bracket has a locking mechanism accessible via a port, wherein the port is concealed by the quick-release interface when the securing bracket is coupled thereto.

19. The anti-theft device of claim 12, wherein the quick-release interface has an access port providing access to the latch, such that the latch is accessible via the access port by a tool, wherein operation of the tool transitions the latch into the second position to disengage the latch from the rail, thereby releasing the securing bracket.

\* \* \* \* \*